Dec. 31, 1968 M. SZABO 3,418,681
COLLAPSIBLE HANDLE OPERABLE BY EXERTION OF A PUSH
DOWNWARDLY ON ONE END THEREOF
Filed April 12, 1967 Sheet 1 of 4
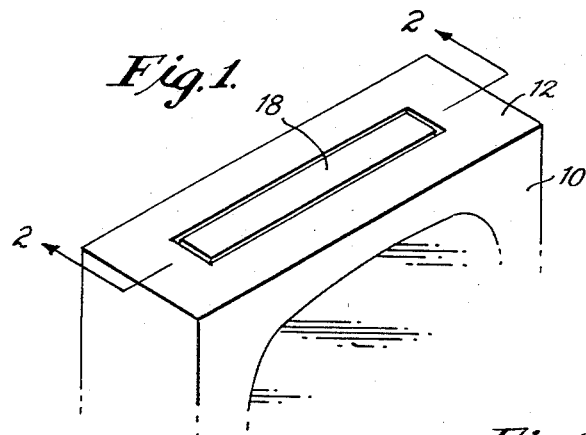
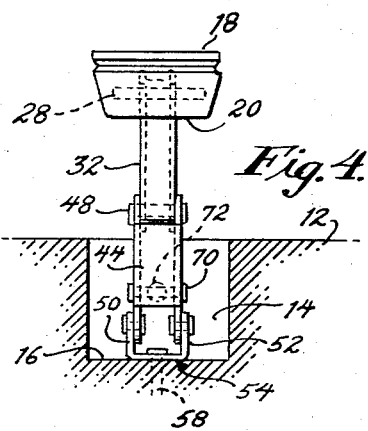
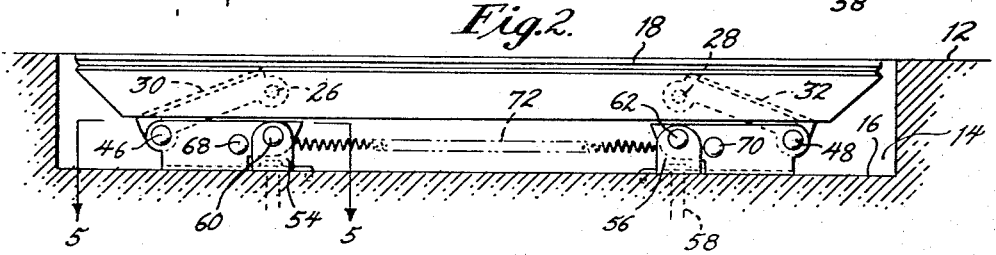
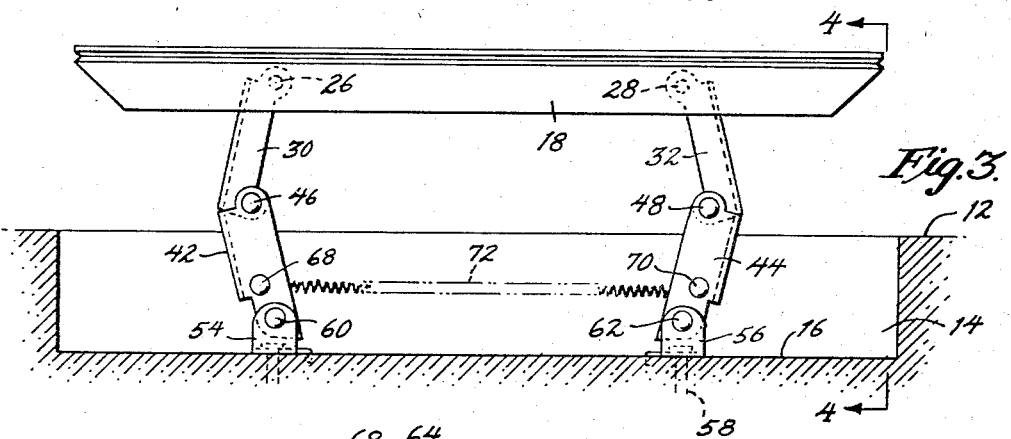
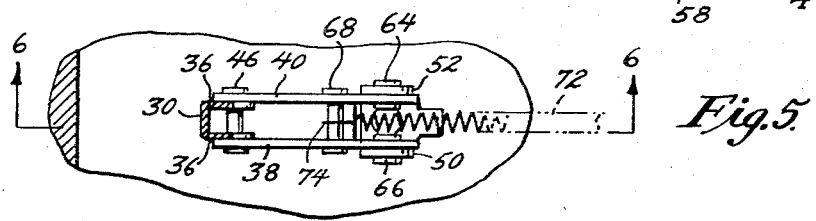
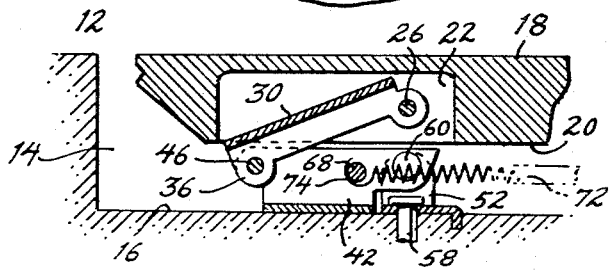
INVENTOR.
MARTON SZABO
BY
ATTORNEY.

INVENTOR.
MARTON SZABO
BY
Max R. Millman
ATTORNEY.

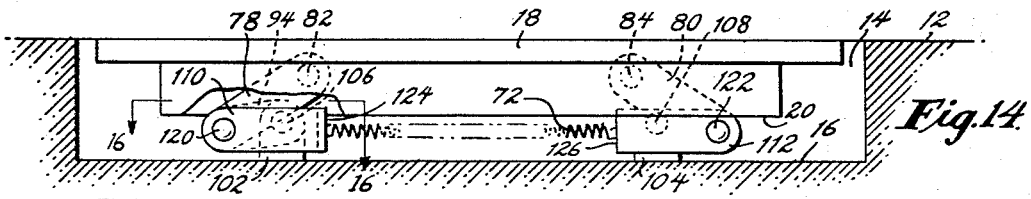
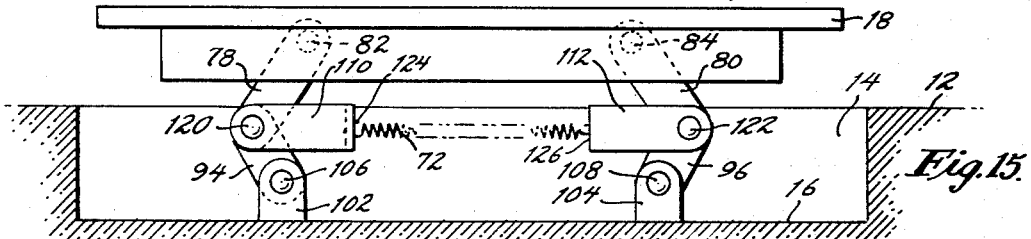
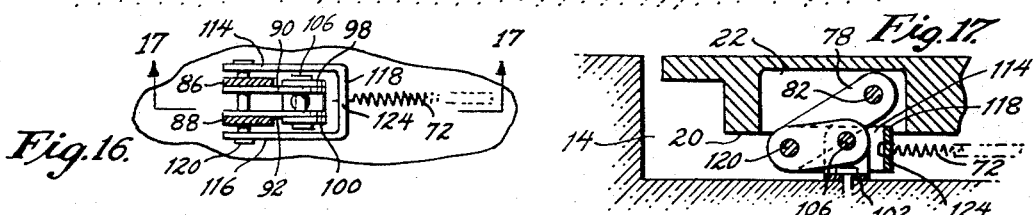
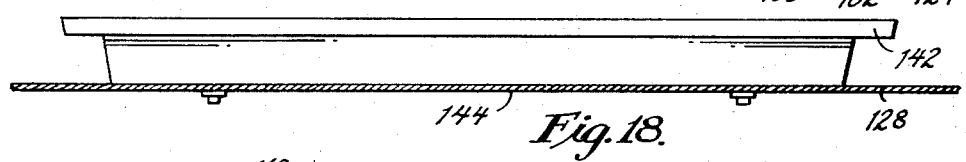
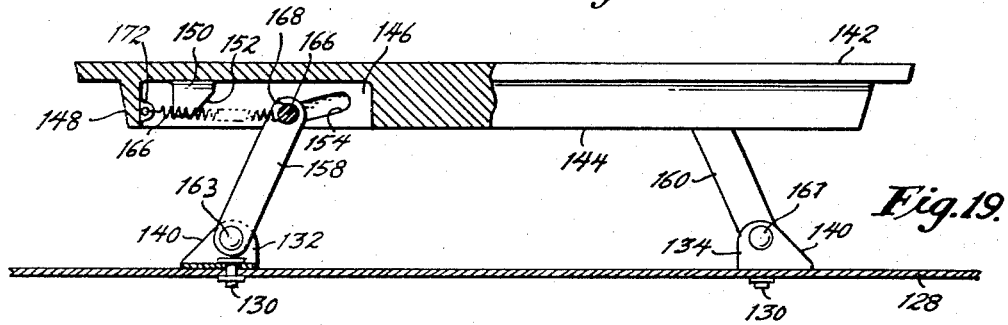
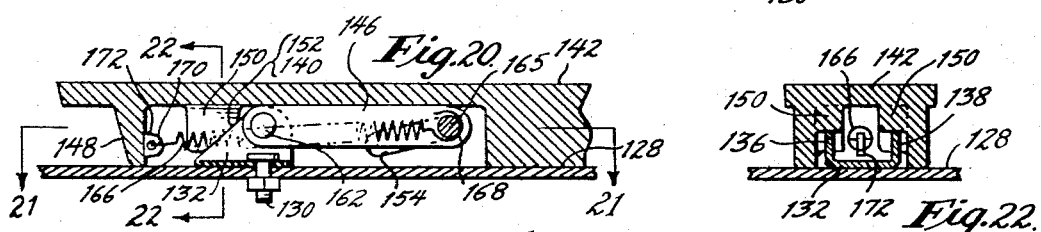
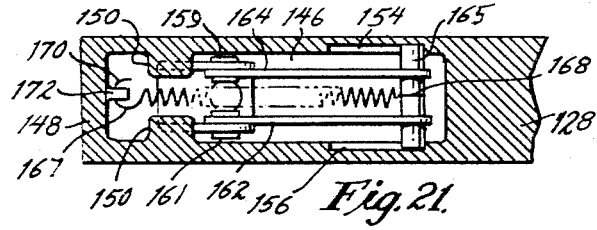

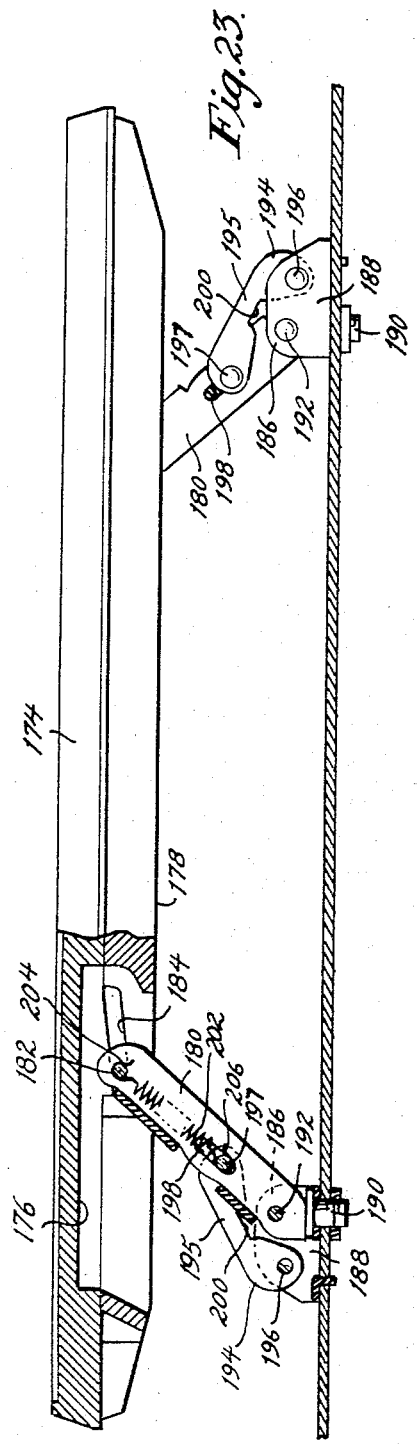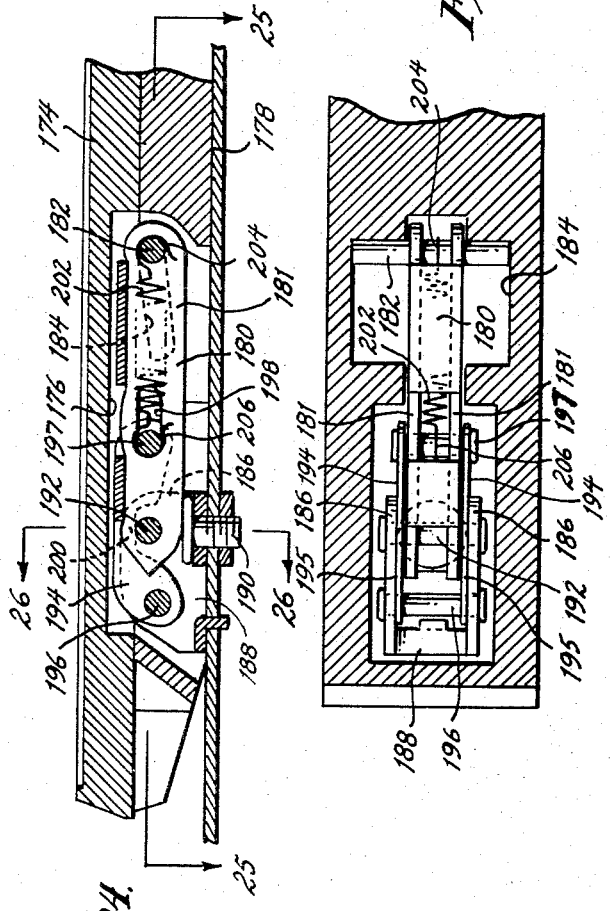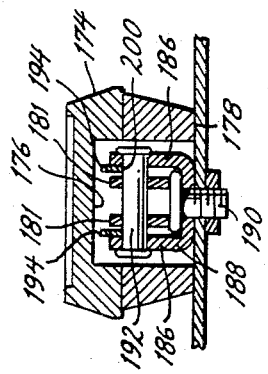

United States Patent Office 3,418,681
Patented Dec. 31, 1968

1

3,418,681
COLLAPSIBLE HANDLE OPERABLE BY EXERTION OF A PUSH DOWNWARDLY ON ONE END THEREOF
Marton Szabo, Broomall, Pa., assignor to Philadelphia Handle Company, Inc., Camden, N.J., a corporation of New Jersey
Filed Apr. 12, 1967, Ser. No. 630,389
10 Claims. (Cl. 16—115)

ABSTRACT OF THE DISCLOSURE

A handle for a carrying case, luggage and the like which is collapsible to a non-carrying position against the carrying case wall or into a well provided therein, the handle including resilient means selectively acting to releasably retain it in the well or against the wall and to urge the handle in a raised carrying position after a push has been exerted on one end thereof.

---

This invention relates to a collapsible handle with hideaway linkage of the type shown in the Bush Patents Nos. 3,289,799 and 3,297,120, the primary object of which is to provide a resilient means which acts to urge the entire handle into its fully raised carrying position once one end of the handle is raised away from the wall of the carrying case to which it is attached.

Another object of the invention is to provide a collapsible handle with hideaway linkage of the character described which employs resilient means that performs the dual functions of urging the handle upwardly into its fully raised carrying position once one end has first been raised and of urging the handle against the carrying case wall and into its collapsed non-carrying position, to thus minimize rattling, without the necessity of providing a mechanical latch or catch as shown in the aforesaid Patent No. 3,289,799.

The foregoing objects are attained by a handle construction in which links pivotally interconnect a handgrip and a carrying case wall with resilient means operatively connected either between opposing links or between the links and the handgrip and in such a manner relative to the points of pivotal connection of the links to the carrying case wall that an over-centering or toggle action occurs when the handgrip is closely adjacent the carrying case wall so that the spring which previously acted to raise the handgrip now acts to hold it against the carrying case wall.

These and other objects of the invention will become more apparent as the following description proceeds in conjunction with the accompanying drawings wherein:

FIG. 1 is a fragmentary perspective view of one form of the handle shown in its collapsed non-carrying position;

FIG. 2 is a sectional view taken on the line 2—2 of FIG. 1;

FIG. 3 is a sectional view similar to FIG. 2 illustrating the raised carrying position;

FIG. 4 is a sectional view taken on the line 4—4 of FIG. 3;

FIG. 5 is an enlarged sectional view taken on the line 5—5 of FIG. 2;

FIG. 6 is a sectional view taken on the line 6—6 of FIG. 5;

2

Figure 12:
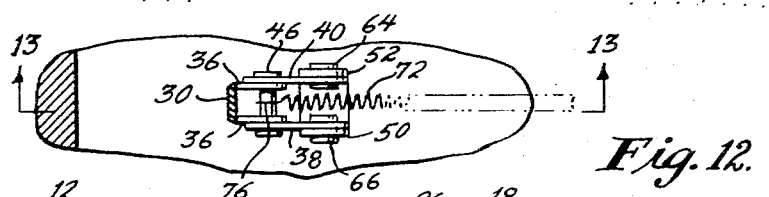
FIG. 12 is a sectional view taken on the line 12—12 of FIG. 10.
Figure 13:
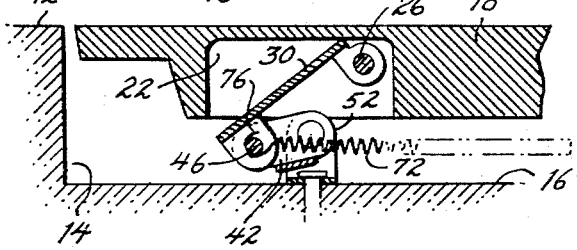

FIG. 13 is a sectional view taken on the line 13—13 of FIG. 12;

FIG. 14 is a sectional view similar to FIG. 2 of a third form of the invention;

FIG. 15 is a sectional view similar to FIG. 3 of the third form of the invention;

FIG. 16 is a sectional view taken on the line 16—16 of FIG. 14;

FIG. 17 is a sectional view taken on the line 17—17 of FIG. 16;

FIG. 18 is a sectional view similar to FIG. 2 of a fourth form of the invention;

FIG. 19 is a view similar to FIG. 3 of the fourth form of the invention and illustrating the raised carrying position;

FIG. 20 is a sectional view of the left end of the handle shown in FIG. 19 and illustrating the collapsed non-carrying position;

FIG. 21 is a sectional view taken on the line 21—21 of FIG. 20;

FIG. 22 is a sectional view taken on the line 22—22 of FIG. 20;

FIG. 23 is a sectional view similar to FIG. 19 of a fifth form of the invention;

FIG. 24 is a sectional view of the left side of the invention shown in FIG. 23 illustrating the collapsed non-carrying position;

FIG. 25 is a sectional view taken on the line 25—25 of FIG. 24; and

FIG. 26 is a sectional view taken on the line 26—26 of FIG. 24.

Specific reference is now being made to the drawings wherein similar reference characters are used for corresponding elements throughout.

Coming first to the first form of the invention shown in FIGS. 1–9, it will be seen that the carrying case 10, which is merely illustrative, has an upper wall 12, a well 14 opening therethrough, and a lower wall 16. The handle has a handgrip 18 which approximates but is somewhat less in length and width than that of the well and is so connected to the carrying case as will soon appear, that it collapses into the well with its upper surface lying substantially flush with that of the upper wall 12 as shown in FIG. 1, and when it is in its raised position, the handgrip is spaced a sufficient distance above the wall 12 as shown in FIG. 2 to permit the same to be gripped for carrying purposes. The handgrip has a bottom surface 20 and recesses 22 adjacent its ends opening therethrough.

Adjacent the inner ends of the recesses the handgrip carries cross pins 26 and 28 which pivotally mount the upper ends of upper links 30 and 32.

The lower ends of each of the links 30 and 32 are formed with laterally spaced ears 36 that are received between the laterally spaced flanges 38 and 40 of lower channel links 42 and 44, there being lateral pins or rivets 46 and 48 which pivotally interconnect the upper links 30 and 32 with the lower links 42 and 44 respectively.

The lower ends of the flanges of the lower links 42 and 44 are in turn received between the laterally spaced ears 50 and 52 of hardware in the form of generally U-shaped anchoring members 54 and 56, which are attached to the bottom wall 16 of the well of the carrying case by appropriate staked-in screws 58. These lower ends of the links 42 and 44 are pivotally secured to the ears 50 and 52 of the members 54 and 56 around transverse pivot axes 60 and 62 formed by blind rivets 64 and 66, see FIG. 5, which pivotally connect the flanges 38 and 40 to the ears 50 and 52 respectively, hence there is no shank which extends between the flanges 38 and 40.

At a predetermined location, intermediate its ends each pair of flanges 38 and 40 of the lower links 42 and 44 mount between them headed pins or rivets 68 and 70. A tension spring 72 is provided whose ends are hooked over or otherwise attached to the pins 68 and 70 carried by the lower links as at 74, see FIG. 6, the spring thus extending between and resiliently connecting the lower links 42 and 44.

Figure 7:
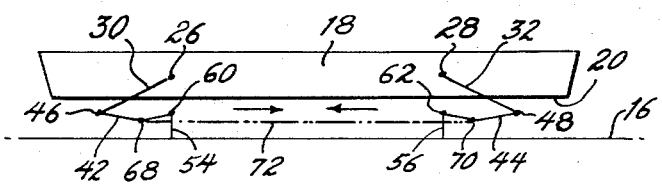
FIGS. 7–9 are diagrammatic views illustrating the one-end push action in raising the handle.

It will be seen, particularly from FIGS. 2, 6 and 7 that in the final collapsed non-carrying position with the bottom surface 20 of the handgrip closely adjacent the bottom wall 16 of the well of the carrying case and the handgrip recesses 22 partially or completely enclosing the folded upper and lower links and hardware attaching the same to the carrying case, the points of attachment of the ends of the spring to the lower links, namely 68 and 70 are on a horizontal line below that joining the points of pivotal attachment of the lower links to the hardware, namely 60 and 62. Thus the spring 72 has been stretched and is, in effect, in toggle thereby urging the handgrip towards the carrying case in the collapsed position to releasably retain it there while minimizing rattling and without the use of a mechanical locking device.

Figure 8:
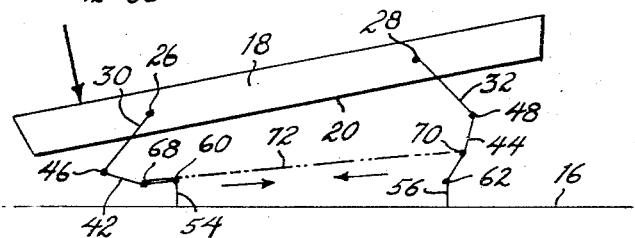
Figure 9:
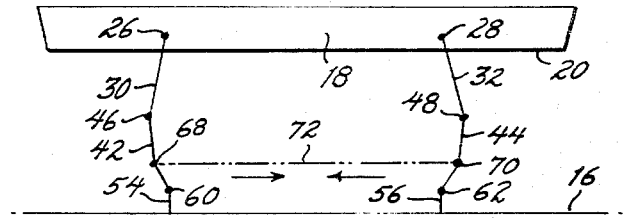
Figure 10:
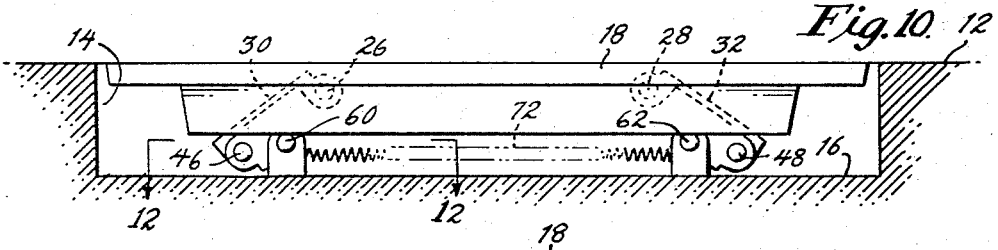
FIG. 10 is a sectional view similar to FIG. 2 of a second form of the invention.
Figure 11:
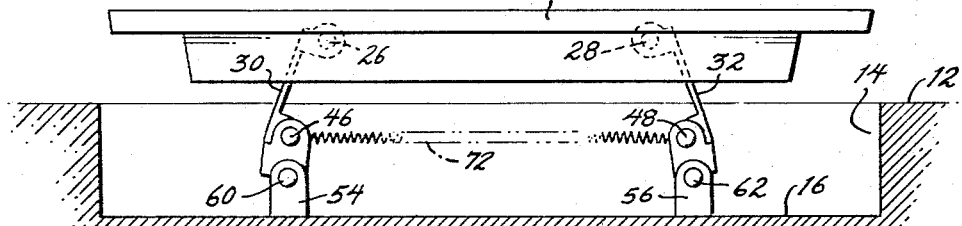
FIG. 11 is a sectional view similar to FIG. 3 of the second form of the invention and illustrating its raised carrying position.

When finger pressure is exerted downwardly on one end of the handgrip, as shown by the arrow in FIG. 8, an opposing upward force is exerted on the other end of the handgrip which acts to unfold the links 32 and 44 on that end of the handle. This begins to compress the spring 72 which compression continues and thus acts to unfold the other set of links 30 and 42 and thus snap the entire handgrip up to its raised carrying position, in which position the spring now acts to pull the links towards each other and urge the handgrip to its raised position. It will be noted that when the spring is over-stretched in the toggle position, the end portions of the spring can extend between the flanges 38 and 40 of the lower links 42 and 44 and between the blind rivets 64 and 66.

The second modification shown in FIGS. 10–13 is the same as that shown in FIGS. 1–9 except that the pins or rivets 68 and 70 carried by the lower links 42 and 44 are eliminated. Instead, the ends of the spring 72 are hooked over or otherwise attached as at 76 to the pins 46 and 48 which pivotally interconnect the upper and lower links. In the final collapsed non-carrying position, the points of attachment of the spring to the links, namely 46 and 48 are below the points of pivotal attachment of the lower links to the carrying case, namely 60 and 62, thus producing the desired over-center or toggle action. This second modification is somewhat less desirable than the first because a larger stretch of the spring is required to provide the final toggle in the collapsed position thus creating greater wear on the spring.

In the third modification shown in FIGS. 14–17, a construction is provided which obviates the need to provide clearance for the ends of the spring when it is over-stretched to its toggle position. Here the upper links 78 and 80 are channel shaped and pivoted to the handgrip at their upper ends around transverse pins 82 and 84 carried by the handgrip in the recesses 22. The flanges 86 and 88 of upper links straddle the flanges 90 and 92 of lower links 94 and 96 which are in turn received between the ears 98 and 100 of attaching hardware 102 and 104 of the type previously described, the lower links being pivoted between the ears 98 and 100 around transverse pins or rivets 106 and 108 which in this case are not blind but solid thus providing a more secure attachment.

Adapters 110 and 112 are provided in the form of U-shaped lugs having arms 114 and 116 connected by a web 118. The arms 114 and 116 straddle both the upper and lower links and transverse headed pins or rivets 120 and 122 pivotally interconnect the arms 114 and 116 with the flanges 86 and 88 of the upper links, with the flanges 90 and 92 of the lower links. The spring 72 is this time hooked over or otherwise attached at its ends as at 124 and 126 to the webs 118 of the adapters. Thus the adapters are, in effect, extensions of the spring and in the collapsed position where the lower surface 20 of the handgrip is adjacent the bottom surface 16 of the well of the carrying case, the end pivots 120 and 122 are below the points 106 and 108 where the lower links are pivoted to the attaching hardware 102 and 104, and the spring therefore acts as if over-centered or in toggle. In this modification, the ends of the spring do not move to a position within the lower links and hence solid pins or rivets 106 and 108 can be employed to pivotally connect the lower links to the attaching hardware 102 and 104. Here again a force exerted on one end of the handle will first cause the other end to rise and then the spring will take over and pop the entire handle up, the spring thus acting selectively to urge the handle up once one end has been raised and to urge the handle towards the carrying case in its final collapsed non-carrying position by virtue of the toggle action of the spring at that position.

In the fourth form shown in FIGS. 18–22, the same principles are applied to a handle construction in which no well need be provided in the wall of the carrying case. Thus the wall 128 of the case can be flat and attached thereto by short staked-in screws 130 that are generally U-shaped clips or hardware 132 and 134, each formed with spaced ears 136 and 138 having outwardly inclined guide edges 140.

The handgrip 142 includes a bottom face 144 and recesses or cavities 146 adjacent its ends which open through the bottom face. Adjacent the end skirt portion 148 of the handgrip, the latter is provided with protuberances 150 having cam faces 152 adapted to mate with the cam faces 140 of the ears 136 and 138 of each attaching member 132 and 134. Towards the other end of the recess, the handgrip is formed with downwardly and outwardly inclined slots 154 and 156 which open into the recess.

Links 158 and 160 are provided preferably formed of spaced bars 162 and 164 between whose upper ends is carried a pin 165 whose ends are slidably engaged in the slots 154 and 156. The lower ends of the bars are connected between the ears 136 and 138 of the attaching hardware 132 and 134 by blind rivets 159 and 161 forming transverse pivot axes 163 and 167 between them. A spring 166 is hooked over or otherwise attached as at 168 to the pin 165 at one of its ends and at its other end is hooked into or otherwise attached as at 170 to an apertured lug 172 formed in the handgrip recess as an inner protuberance of the end skirt 148. Thus in the collapsed non-carrying position with the bottom surface 144 of the handgrip against or closely adjacent the case wall 128, the recesses 146 enclose all the moving parts as well as the attaching hardware 132 and 134. As seen in FIG. 20, the pin 165 has moved towards the inner ends of the slots 154 and 156 and the spring 166 has been stretched. In the final collapsed position the point of attachment 170 of each spring is below each point 163 and 167 which pivotally secures the links 158 and 160 to the case. This creates an over-stretching or toggle action which urges the handgrip positively towards the case wall to minimize rattling. In this form of the invention the force applied to one end of the handle also moves it longitudinally and the cooperating cams 140 and 152 assist this action. This will then raise the other end of the handle and then the springs will take over to cause the entire handle to pop up to its raised position. In this raised position the springs act to urge the links and hence the handgrip upwardly while in the collapsed position, they act to urge the links and hence the handgrip downwardly against the case wall.

The fifth form shown in FIGS. 23–26 is a variant of the fourth form. The handgrip 174 has recesses 176 towards its ends which open through its bottom face 178. Links 180 formed of spaced interconnected bars 181 carry transverse pins 182 whose ends extend slidably into inclined slots 184 formed in the handgrip that open into the recesses 176. The lower end of the link extends between ears 186 of hardware 188 which is attached as at 190 to the carrying case wall and is there pivoted around a transverse axis 192 provided by a solid rivet.

A generally kidney-shaped adapter 194 is pivoted around a transverse pin 196 between the ears 186 of the attaching hardware 188 outwardly towards the ends of the handgrip beyond the pivots 192. This adapter is also formed of interconnected spaced bars 195 which carry at their other ends a transverse pin 197 whose ends extend slidably into slots 198 in the link 180 intermediate its ends. Notches 200 are provided in the undersurfaces of the bars 195 of the adapter 194 for a purpose soon to appear. A spring 202 is terminally attached as at 204 and 206 to the pins 182 and 197. Thus when the handgrip is moved to its fully collapsed non-carrying position with its bottom surface 178 closely adjacent or against the case wall the recesses 176 enclose all of the moving parts and the attaching hardware. The pins 182 move towards the inner ends of the handgrip slots 184 and the pins 197 of the adapter move towards the opposite or outer ends of the link slots 198 as seen in FIG. 24. In so doing the adapter notches 200 overlay the pivot pins 192. The pivots 196 of the adapters assume a position below the link pivots 192 and, since the adapters are in effect extensions of the springs 202, the spring is over-centered or toggled thereby urging the handgrip positively against the case to minimize rattling. When a force is applied to one end of the handle, the link 180 and adapter 194 at the other end of the handle unfolds or moves upwardly and then the springs take over and snap the entire handle to the raised carrying position. Here again because the spring is attached to the adapters, solid rivets 192 can be used to attach the links 180 to the hardware 186 since the stretched spring need not clear the rivets in the collapsed position.

While preferred embodiments of the invention have been here shown and described, it will be understood that skilled artisans may make minor variations without departing from the spirit of the invention and the scope of the appended claims.

I claim:

1. For use with a carrying case having anchoring members attached thereto, a collapsible handle comprised of an elongated handgrip, link means pivotally interconnecting said handgrip with said anchoring members, and resilient means operative on said link means selectively urging said handgrip upwardly to a raised carrying position when at least one end of said handgrip has been raised and urging said handgrip against said case when said handgrip is closely adjacent thereto in its collapsed non-carrying position, one end of said resilient means falling below the point of attachment of the link means to the anchoring member when said handgrip is in its collapsed non-carrying position to provide toggle action retention.

2. The combination of claim 1 wherein said means pivotally interconnecting said handgrip with said anchoring members includes pairs of upper and lower pivotally interconnected links and means pivoting each lower link to an anchoring member, said resilient means including a spring terminally attached between said lower links, the points of attachment of said spring being below the points of pivotal attachment of said lower links to said anchoring members when said handgrip is closely adjacent said carrying case in the collapsed non-carrying position and above said points of pivotal attachment when said handgrip moves into its raised carrying position.

3. The combination of claim 2 wherein said spring is terminally attached to said lower links between the points of pivotal attachment of said upper and lower links to each other and the points of pivotal attachment of said lower links to said anchoring members.

4. The combination of claim 2 wherein said spring is terminally attached to the pivotal interconnection between said upper and lower links.

5. The combination of claim 1 wherein said means pivotally interconnecting said handgrip with said anchoring means includes spaced links each pivoted at its lower end to an anchoring member, means slidably mounting the upper end of said link to said handgrip and a spring terminally attached between said link and said handgrip so that in the collapsed non-carrying position with said handgrip closely adjacent said carrying case the points of attachment of said springs to said handgrip are below the points of pivotal attachment of said links to said anchoring members thereby urging said handgrip positively towards said carrying case.

6. The combination of claim 5 and recesses in said handgrip enclosing said links, springs and anchoring members when said handgrip is in its collapsed non-carrying position closely adjacent said carrying case.

7. The combination of claim 6, cams on said anchoring member and cams in said recesses engageable with said anchoring member cams to permit limited relative longitudinal movement between said handgrip and said carrying case.

8. The combination of claim 1 wherein said means pivotally interconnecting said handgrip with said anchoring members includes pairs of upper and lower links, means pivoting said upper links to said handgrip means pivoting said lower links to said anchoring members, an adapter having spaced legs embracing said links and a web disposed towards the center of said handgrip, and means pivotally interconnecting said upper link with said legs of said adapter and said lower link, said resilient means including a spring terminally attached to the webs of said adapters, the points of pivotal interconnection of said upper links with said legs of said adapter and said lower links being below the points where said lower links are pivotally attached to said anchoring members when said handgrip is closely adjacent said carrying case in its collapsed non-carrying position.

9. The combination of claim 1 wherein said means pivotally interconnecting said handgrip with said anchoring members includes a pair of links, means pivoting the lower end of each link to an anchoring member, means slidably mounting the upper end of said link on said handgrip, adapters each pivoted to an anchoring member at its lower end and means slidably connecting the upper end of said adapter to said link, said resilient means including a spring terminally attached to said means slidably mounting said link on said handgrip and slidably connecting said adapter to said link so that in the collapsed non-carrying position with said handgrip closely adjacent said carrying case the points of pivotal attachment of said adapters to said anchoring members is below the points of pivotal attachment of said links to said anchoring members.

10. The combination of claim 9 and notches in said adapters receiving said means pivoting the lower ends of said links to said anchoring members when said handle is in its collapsed noncarrying position.

References Cited

UNITED STATES PATENTS 2,723,417    11/1955    Furholmon _____ 16—115
3,388,416    6/1968    Szabo _____ 16—115

BOBBY R. GAY, *Primary Examiner.*

D. L. TROUTMAN, *Assistant Examiner.*

U.S. Cl. X.R.

190—58